US007117053B1

(12) United States Patent
Absar et al.

(10) Patent No.: US 7,117,053 B1
(45) Date of Patent: Oct. 3, 2006

(54) MULTI-PRECISION TECHNIQUE FOR DIGITAL AUDIO ENCODER

(75) Inventors: Mohammed Javed Absar, Singapore (SG); Sapna George, Singapore (SG); Anotonio Mario Alvarez-Tinoco, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/830,441

(22) PCT Filed: Oct. 26, 1998

(86) PCT No.: PCT/SG98/00084

§ 371 (c)(1), (2), (4) Date: Jun. 11, 2001

(87) PCT Pub. No.: WO00/25249

PCT Pub. Date: May 4, 2000

(51) Int. Cl.
*G06F 17/00* (2006.01)

(52) U.S. Cl. .......................................................... 700/94

(58) Field of Classification Search .................. 700/94; 712/35, 32, 33, 34; 704/500, 501, 502, 503, 704/504

See application file for complete search history.

(56) References Cited

U.S. PATENT DOCUMENTS 5,787,025 A * 7/1998 Muwafi et al. ............. 708/490
6,208,671 B1 * 3/2001 Paulos et al. ............... 370/545

FOREIGN PATENT DOCUMENTS

EP 0778536 A2 * 6/1997
WO WO 98/28695 * 7/1998

OTHER PUBLICATIONS

ATSC Digital Audio Compression Standard (AC-3) Dec. 20, 1995.*
American Heritage College Dictionary Definition of Precision.*
Merriam-Webster definition of precision.*

* cited by examiner

*Primary Examiner*—Sinh Tran
*Assistant Examiner*—Andrew C. Flanders
(74) *Attorney, Agent, or Firm*—Lisa K. Jorgenson; Robert Iannucci; Seed IP Law Group PLLC

(57) ABSTRACT

AC-3 is a high quality audio compression format widely used in feature films and, more recently, on Digital Versatile Disks (DVD). For consumer applications the algorithm is usually coded into the firmware of a DSP Processor, which due to cost considerations may be capable of only fixed point arithmetic. Commercial AC-3 Encoders have been successfully implemented on 20-bit and 24-bit word-length processors. However, it is generally assumed that 16-bit processing is incapable of delivering the high fidelity audio, expected from the AC-3 technology. Double precision computation can be utilised on such processors to provide the high quality; but the computational burden of such implementation will be beyond the capacity of the processor to enable real-time operation. Through extensive simulation study of a high quality AC-3 Encoder implementation, a multi-precision technique for each processing block is presented whereby the quality of the encoder on a 16-bit processor matches the single precision 24-bit implementation very closely without excessive additional computational complexity.

24 Claims, 7 Drawing Sheets

MULTI-PRECISION TECHNIQUE FOR DIGITAL AUDIO ENCODER

FIELD OF THE INVENTION

This invention is applicable in the field of audio encoders, and in particular to those audio encoders which may be implemented on fixed point arithmetic digital processors, such as for professional and commercial applications.

BACKGROUND OF THE INVENTION

In order to more efficiently broadcast or record audio signals, the amount of information required to represent the audio signals may be reduced. In the case of digital audio signals, the amount of digital information needed to accurately reproduce the original pulse code modulation (PCM) samples may be reduced by applying a digital compression algorithm, resulting in a digitally compressed representation of the original signal. The goal of the digital compression algorithm is to produce a digital representation of an audio signal which, when decoded and reproduced, sounds the same as the original signal, while using a minimum of digital information for the compressed or encoded representation.

Recent advances in audio coding technology have led to high compression ratios while keeping audible degradation in the compressed signal to a minimum. These coders are intended for a variety of applications, including 5.1 channel film soundtracks. HDTV, laser discs and multimedia. Description of one applicable method can be found in the Advanced Television Systems Committee (ATSC) Standard document entitled "Digital Audio Compression (AC-3) Standard", Document A/52, 20 Dec. 1995, and the disclosure of that document is hereby expressly incorporated herein by reference.

The implementation of an AC-3 encoder by translation of the requirements and processes from the abovementioned AC-3 Standard onto the firmware of a Digital Signal Processor (DSP) core involves several phases. Firstly, the essential compression algorithm blocks of the AC-3 Encoder have to be designed, since it is only the functions which are defined by the standard. After individual blocks are completed, they are integrated into an encoding system which receives a PCM (pulse code modulated) stream, processes the signal applying signal processing technique such as transient detection, frequency transformation, masking and psychoacoustic analysis, and produces a compressed stream in the format of the AC-3 Standard.

The coded AC-3 stream should be capable of being decompressed by any standard AC-3 Decoder and the PCM stream generated thereby should be comparable in audio quality to the original music stream. If the original stream and the decompressed stream are indistinguishable in audible quality (at reasonable level of compression) the development moves to the third phase. If the quality is not transparent (indistinguishable), further algorithmic development and improvements continue.

In the third phase the algorithms are simulated in a high level language (e.g. C) using the word-length specifications of the target DSP-Core. Most commercial DSP-Cores allow only fixed point arithmetic (since a floating point engine is costly in terms of integrated circuit area). Consequently, the encoder algorithms are translated to a fixed point solution. The word-length used is usually dictated by the ALU (arithmetic-logic unit) capabilities and bus-width of the target core. For example, an AC-3 encoder on a Motorola 56000 DSP would use 24-bit precision since it is a 24-bit Core. Similarly, for implementation on a Zoran ZR38000 which has a 20-bit data path, 20-bit precision would be used.

If, for example, 20-bit precision is discovered to provide an unacceptable level of sound quality, the provision to use double precision always exists. In this case each piece of data is stored and processed as two segments, lower and upper words, each of 20-bit length. The accuracy of implementation is doubled but so is the computational complexity, and double precision multiplication could require 6 or more cycles where a single precision multiplication and additional (MAC) may use only a single cycle. Block exponent and other boosting techniques specific to the AC-3 encoder can be judiciously used to improve quality, but these features are not always found on the commercial DSPs.

Single precision 24-bit AC-3 encoders are known to provide sufficient quality. However 16-bit single precision AC-3 encoder quality is considered very poor. Consequently, the implementation of AC-3 encoders on 16-bit DSP cores has not been popular. Since a single precision 16-bit implementation of an AC-3 encoder results in unacceptable in reproduction quality, such a product would be at a distinct disadvantage in the consumer market. On the other hand, double precision implementation is too computationally expensive. It has been estimated that a fully double precision implementation would require over 140 MIPS (million instruction per second). This exceeds what most commercial DSPs can provide, and moreover, extra MIPS are always needed for system software and value-added features.

SUMMARY OF THE INVENTION

In accordance with the present invention, there is provided a method for coding digital audio data with a transform encoding process implemented on a fixed point digital signal processor having multiple levels of computation precision, wherein the transform encoding process includes a plurality of computation stages involving arithmetic operations in transforming the digital audio data into coded data, and wherein different ones of the computation stages utilise different preselected levels of computational precision, characterised in that:

the transform encoding process is in accordance with AC-3 Digital Audio Compression Standard.

The present invention also provides a digital audio transform encoder for coding digital audio data into compressed audio data, comprising a fixed point signal processor having multiple levels of computation precision, and transform encoding process code stored in firmware or software for controlling the digital signal processor, wherein the transform encoding process code includes a plurality of computation blocks involving arithmetic operations in transforming the digital audio data into compressed audio data, and wherein different ones of the computation blocks are performed by the digital signal processor using different preselected levels of computational precision, characterised in that:

the transform encoding process code is in accordance with AC-3 Digital Audio Compression Standard.

In a preferred form of the invention, the audio transform encoding system is implemented on a 16-bit digital signal processor which is capable of single (16-bit) precision computations and double (32-bit) computations. Accordingly, the preferred 16-bit implementation uses combinations of single and double precision to best match the reference floating point model. Thereby, computational complexity is reduced without sacrificing quality excessively. The features of the preferred embodiment which are discussed in general terms below are thus presented in the context of such an implementation.

For transient detection, single precision (16-bit) calculations can be used. The input stream of PCM audio data is assumed to be 16 bits (else it is truncated to 16 bits for this stage) and the high pass filter coefficients are restricted to 16-bits as well. The filtered 16-bit data is segmented and analysed to detect transients. Simulation results with music streams indicate that the result of this implementation matches over 99% of the time with the floating point version. Since this step involves only 16-bit operations it is termed as 16—16 (data:coefficient) processing.

The input 16-bit PCM is transformed to the frequency domain by first applying a window with 32-bit length coefficients. Therefore windowing is 16-32 (data:coefficient) processing. If the input PCM is 24-bit, then 32-16 processing for windowing may be used wherein the PCM data is treated as 32-bit (upper bits sign extended) and is multiplied by 16-bit window coefficients.

Frequency Transformation using Modified Discrete Cosine Transform (MDCT) is performed using 32-bit data and 16-bit coefficients. For each calculations, the input data is 32-bit and is multiplied by the coefficient (sine and cosine terms) which are 16-bit in length. The resulting 48-bit is truncated to 32-bit for the next step of processing. This form of frequency transformation with 32-16 processing can be shown to give 21–25 bit accuracy with 80% confidence, when compared with the floating point version.

Each 32-bit frequency coefficient is assumed to be stored in two 16-bit registers. For phase and coupling strategy calculations the upper 16-bit of the data can be utilised. Once the strategy for combining the coupled channel to form the coupling channel is known, the combining process uses the full 32-bit data. The computation is reduced while the accuracy is still high. Simple truncation of the upper 16-bit of the 32-bit data for the phase and coupling strategy calculation leads to poor result ( only 80% of the time the strategy matches with that from the floating point version), and thus a block exponent pre-processing method can be employed. If the block exponent method is used the coupling strategy is 97% of the time exactly same as the floating point.

A rematrixing decision determines whether to code coefficients as left (L) and right channel (R), or the sum (L+R) and difference (L–R) of the channels, and can be made using the upper 16-bit of the 32-bit data. The actual rematrix coding of coefficients preferably uses the full 32-bit data as in the coupling calculations.

The remaining processing of the AC-3 encoding, including exponent coding, quantization and bit allocation are defined as fixed point arithmetic in the AC-3 Standard and therefore word-length choices are not encountered in these calculations.

BRIEF DESCRIPTION OF THE DRAWINGS

The invention is described in greater detail hereinafter, by way of example only, with reference to the accompanying drawings, wherein.

DETAILED DESCRIPTION OF THE PREFERRED EMBODIMENTS

In the following detailed description of the preferred embodiments of the invention, firstly a system-level description of an AC-3 encoder is provided. This serves to explain the overall processes and describe the significant of each processing block in the overall audio compression system.

After the system level description, the word-length requirements of each processing blocks, where fixed point arithmetic is used, is discussed. This includes the transient-detection, frequency transformation, rematrixing and coupling blocks. By analysis of data gathered through expensive simulation, and statistics derived thence, appropriate word-length requirements for each block are then estimated. In particular, this description deals with the issue of the implementation of the dual-channel AC-3 encoder on a 16-bit processor in a manner such that the processing requirement is not prohibitive and the quality is comparable to implementation on single precision 24-bit processor.

System Overview

Figure 1:
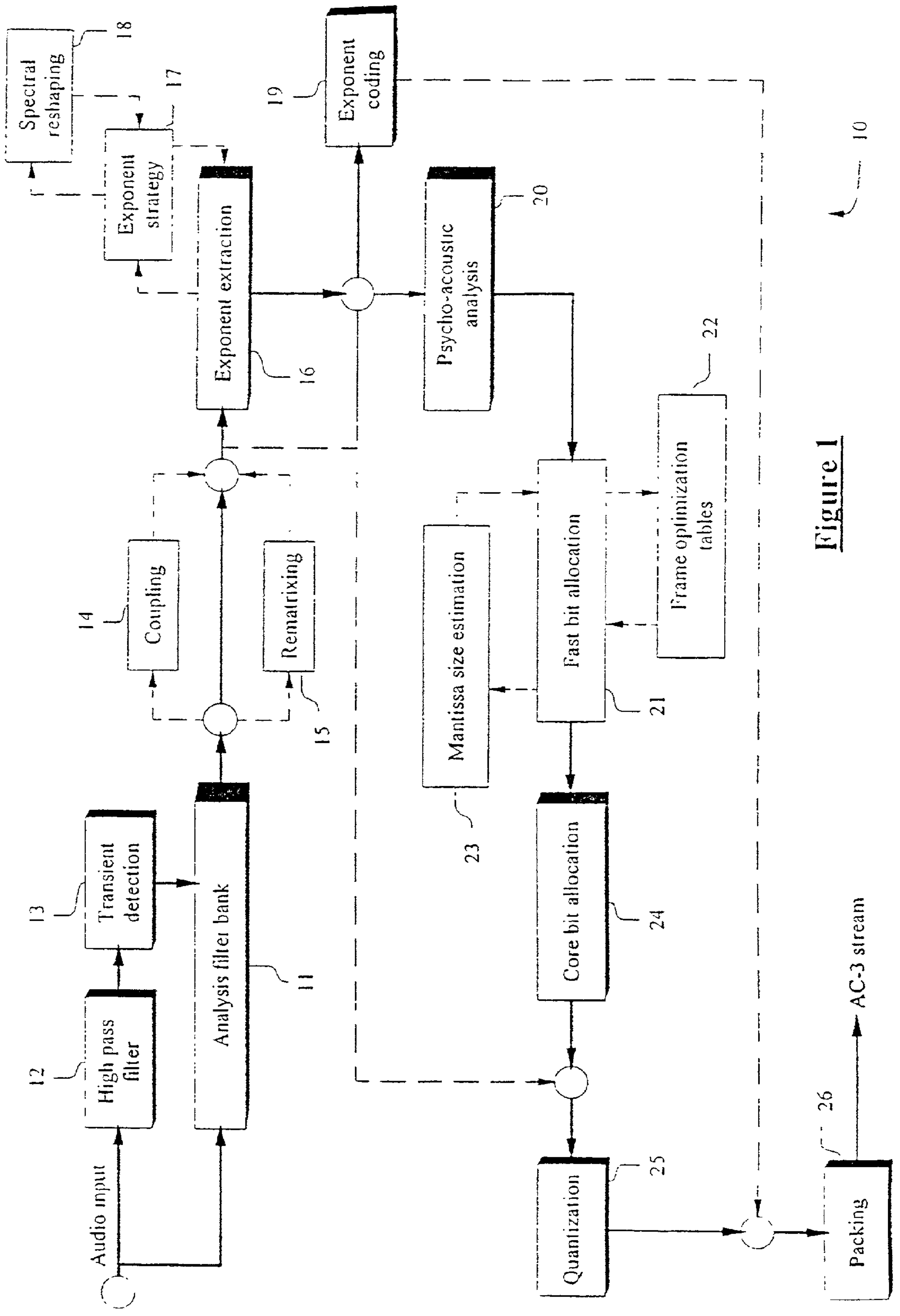
FIG. 1 is a system block diagram of an AC-3 compliant audio encoder.

Like and AC-2 single channel coding technology from which it is derived, an AC-3 audio coder is fundamentally an adaptive transform-based coder using a frequency-linear, critically sampled filter bank based on the Princen Bradley Time Domain Aliasing Cancellation (TDAC) technique. An overall system block diagram of an AC-3 coder 10 is shown in FIG. 1. It may be noted that, of the blocks shown in FIG. 1, blocks such as the Frame Optimisation Tables 22, Fast Bit Allocation 21 and Spectral Reshaping 18 are not directly part of the AC-3 Standard but are desirable for high quality audio reproduction and for reducing the computational burden.

Audio Input Format

AC-3 is a block structured coder, so one or more blocks of time domain signal, typically 512 samples per block and channel, are collected in an input buffer before proceeding with additional processing.

Transient Detection

Transients are detected in the full-bandwidth channels in order to decide when to switch to short length audio blocks for restricting quantization noise associated with the transient within a small temporal region about the transient. The input audio signals are high-pass filtered (12), and then examined by a transient detector (13) for an increase in energy from one sub-block time segment to the next. Sub-blocks are examined at different time scales. If a transient is detected in the second half of an audio block in a channel, that channel switches to a short block (256 samples). In presence of a transient the bit 'blksw' for the channel in the encoded bit stream in the particular audio block is set.

The transient detector operates on 512 samples for every audio block. This is done in two passes, with each pass processing 256 samples. Transient detection is broken down into four steps:

1. high pass filtering;
2. segmentation of the block into sub-multiples;
3. peak amplitude detection within each sub-block segment; and
4. threshold comparison.

The transient detector outputs the flag blksw for each full-bandwidth channel, which when set to 'one' indicates the presence of a transient in the second half of the 512 length input block for the corresponding channel. The four stages of the transient detection are described in further detail below.

1) High pass filtering: The high-pass filter can be implemented as a cascade biquad direct form II IIR filter with a cut-off of 8 kHz.

2) Block segmentation. The block of 256 high-pass filtered samples are segmented into a hierarchical tree of levels in which level 1 represents the 256 length block, level 2 is two segments of length 128, and level 3 is four segments of length 64.

3) Peak Detection: The sample with the largest magnitude is identified for each segment on every level of hierarchical tree. The peaks for a single level are found as follows:

P[i][j]=max(x(n))

for n=(512×(k–1)/2'j)+1, . . . (512×k/2'j)−1 and k=1, . . . 2'(j=1);

where x(n)=the nth sample in the 256 length block j=1, 2, 3 is the hierarchical level number k=the segment number within level j 4) Threshold comparison. The first stage of the threshold comparator checks to see if there is significant signal level in the current level. This is done by comparing the overall peak value P[1][1] of the current block to a "silence threshold". If P[1][1] is below this threshold then a long block is forced. The silence threshold value is 100/32768. The next stage of the comparator checks the relative peak levels of adjacent segments on each level of the hierarchical tree. If the peak ratio of any two adjacent segments on a particular level exceeds a pre-defined threshold for that level, then a flag is set to indicate the presence of a transient in the current 256 length block.

Time Domain Aliasing Cancellation (TDAC) Filter Bank

The time domain input signal for each channels is individually windowed and filtered with a TDAC-based analysis filter bank (11) to generate frequency domain coefficients. If the blksw bit is set, meaning that a transient was detected fro the block, then two short transforms of length 256 each are taken, which increases the temporal resolution of the signal. If blksw is not set, a single long transform of length 512 is taken, thereby providing a high spectral resolution.

The output frequency sequence [k] is defined as:

$$X_k = \sum_{n=N-1}^{n=0} x[n]*\cos(2\pi*(2n+1)*(2k+1)/4N + \pi*(2k+1)/4)$$

$$k = 0 \ldots (N/2-1)$$

where x[n] is the windowed input sequence for a channel and N is the transform length.

Instead of evaluating $X_k$ in the form given above it can be computed in a computationally efficient manner as described in the specification of International Patent Application No. PCT/SG98/00014 entitled "*A Fast Frequency Transformation Technique for Transform Audio Coders*" The disclosure of that document is hereby expressly incorporated herein by reference, and an explanatory extract is presented below:

Instead of evaluating $X_k$ in the form given above it could be computed as $$X_k = \cos\gamma*(g_{k,r}\cos(\pi(k+1/2)/N) - g_{k,i}\sin(\pi(k+1/2)/N)) - \sin\gamma*(g_{k,r}\sin(\pi(k+1/2)/N) + g_{k,i}\cos(\pi(k+1/2)/N))g_{k,r},\ g_{k,i} \in \Re \text{ (set of real numbers)}$$

where $$G_k = g_{k,r} + jg_{k,i} = \sum_{n=0}^{n=N-1} (x[n]e^{j\pi n/N})*e^{j2\pi nk/N}.$$

The symbol j represents the imaginary number $\sqrt{-1}$. The expression $$\sum_{n=0}^{n=N-1} (x[n]e^{j\pi n/N})*e^{j2\pi nk/N}$$

is obtained from the well known FFT method, by first using transformation $x'[n]=x[n]*e^{j\pi 1nv/N}$ and the computing the FFT $$G_k = \sum_{n=0}^{n=N-1} x'[n]*e^{j2\pi nk/N}$$

Coupling

High compression can be achieved in AC-3 by use of a technique known as coupling. Coupling takes advantage of the way the human ear determines directionality for high frequency signals. At high audio frequency (approximately above 4 KHz), the ear is physically unable to detect individual cycles of an audio waveform and instead responds to the envelope of the waveform. Consequently, the encoder 10 may include a coupling processor (14) which combines the high frequency coefficients of the individual channels to form a common coupling channel. The original channels combined to from the coupling channel are called the coupled channels.

The most basic encoder can from the coupling channel by simply taking the average of all the individual channel coefficients. A more sophisticated encoder could alter the signs of the individual channels before adding them into the sum to avoid phase cancellation.

The generated coupling channel is sectioned into a number of bands. For each such band and each coupling channel a coupling co-ordinate is transmitted to the decoder. To obtain the high frequency coefficients in any band, for a particular coupled channel, from the coupling channel, the decoder multiplies the coupling channel coefficients in tha frequency band by the coupling co-ordinate of that channel for that particular frequency band. For a dual channel encoder a phase correction information is also sent for each frquency band of the coupling channel.

Superior methods of coupling channel formation are discussed in the specification of International Patent Applications PCT/SG97/00076, entitled "*Method and Apparatus for Estimation of Coupling Parameters in a Transform Coder for High Quality Audio*", and PCT/SG97/00075 entitled "*Method and Apparatus for Phase Estimation in a Transform Coder for High Quality Audio*". The disclosures of those specifications are hereby expressly incorporated herein by reference. An explanatory extract from the latter specification is presented below for reference.

"Assume that the frequency domain coefficients are identified as:

$a_1$, for the first coupled channel, $b_1$, for the second coupled channel, $c_1$, for the coupling channel, For each sub-band, the value Σ, a, *b, is computed index i extending over the frequency range of the sub-band. If $\Sigma_i a_i * b_i > 0$, coupling for this sub-band is performed as $c_i = (a_i + b)/2$. Similarly, if $\Sigma_i a_i * b_i < 0$, then coupling strategy for the sub-band is performed as $c_i = (a_i - b_i)/2$.

Adjacent sub-bands using identical coupling strategies may be grouped together to form one or more coupling bands. However, sub-bands with different coupling strategies must not be banded together. If overall coupling strategy for a band is $c_i = (a_i + b_i)/2$, i.e. for all sub-bands comprising the band the phase flag for the band is set to +1, else it is set to −1."

Rematrixing

An additional process, rematrixing (15), is invoked in the special case that the encoder is processing two channels only. The sum and difference of the two signals from each channel are calculated on a band by band basis, and if, in a given band, the level disparity between the derived (matrixed) signal pair is greater than the corresponding level of the original signal, the matrix pair is chosen instead. More bits are provided in the bit stream to indicate this condition, in response to which the decoder performs a complementary unmatrixing operation to restore the original signals. The rematrix bits are omitted if the coded channels are more than two.

The benefit of this technique is that it avoids directional unmasking if the decoded signals are subsequently processed by a matrix surround processor, such a Dolby Prologic (TM) decoder.

In AC-3, rematrixing is performed independently in separate frequency bands. There are four bands with boundary locations dependent on the coupling information. The boundary locations are by coefficient bin number, and the corresponding rematrixing band frequency boundaries change with sampling frequency.

Conversion to Floating Point

The transformed values, which may have undergone rematrix and coupling process, are converted to a specific floating point representation at the exponent extraction block (16), resulting in separate arrays of binary exponents and mantissas. This floating point arrangement is maintained through out the remainder of the coding process, until just prior to the decoder's inverse transform, and provides 144 dB dynamic range, as well as allows AC-3 to be implemented on either fixed or floating point hardware.

Coded audio information consists essentially of separate representation of the exponent and mantissa arrays. The remaining coding process focuses individually on reducing the exponent and mantissa data rate.

The exponents are coded using one of the exponent coding strategies. Each mantissa is truncated to a fixed number of binary places. The number of bits to be used for coding each mantissa is to be obtained from a bit allocation algorithm which is based on the masking property of the human auditory system.

Exponent Coding Strategy

Exponent values in AC-3 are allowed to range from 0 to −24. The exponent acts as a scale factor for each mantissa, equal to $2^{-exp}$. Exponents for coefficients which have more than 24 leading zeros are fixed at −24 and the corresponding mantissa are allowed to have leading zeros.

AC-3 bit stream contains exponents for independent, coupled and the coupling channels. Exponent information may be shared across blocks within a frame, so blocks 1 through 5 may reuse exponents from previous blocks.

AC-3 exponent transmission employs differential coding technique, in which the exponents for a channel are differentially coded across frequency. The first exponent is always sent as an absolute value. The value indicates the number of leading zeros of the first transform coefficient. Successive exponents are sent as differential values which must be added to the prior exponent value to form the next actual exponent value.

The differential encoded exponents are next combined into groups. The grouping is done by one of the three methods D15, D25 and D45. These together with 'reuse' are referred to as exponent strategies. The number of exponents in each group depends only on the exponent strategy. In the D15 mode, each group is formed from three exponents. In D45 four exponents are represented by one differential value. Next, three consecutive such representative differential values are grouped together to form one group. Each group always comprises of 7 bits. In case the strategy is 'reuse' for a channel in a block, then no exponents are sent for that channel and the decoder reuses the exponents last sent for this channel.

Pre-processing of exponents prior to coding can lead to better audio quality. One such processing technique is described in the specification of International Patent Application PCT/SB98/0002 entitled "*Method and Apparatus for Spectral Exponent Reshaping in a Transform Coder for High Quality Audio*", the disclosure of which is incorporated herein by reference.

Choice of the suitable strategy for exponent coding forms an important aspect of AC-3, and in the encoder 10 shown in FIG. 1 is performed by the process blocks 17, 18. D15 provides the highest accuracy but is low in compression. On the other hand transmitting only one exponent set for a channel in the frame (in the first audio block of the frame) and attempting to 'reuse' the same exponents for the next five audio block, can lead to high exponent compression but also sometimes very audible distortion.

Several methods exist for determination of exponent strategy, and one such method is described in the specification of International Patent Application no. PCT/SG98/0009 entitled "*A Neural Network Based Method for Exponent Coding in a Transform Coder for High Quality Audio*".

Bit Allocation for Mantissa

The bit allocation algorithm (block 21) analyses the spectral envelope of the audio signal being coded, with respect to masking effects, to determine the number of bits to assign to each transform coefficient mantissa. In the encoder, the bit allocation is recommended to be performed globally on the ensemble of channels as an entity, from a common bit pool.

The bit allocation routine contains a parametric model (pyscho-acoustic analysis block 20) of the human hearing for estimating a noise level threshold, expressed as a function of frequency, which separates audible from inaudible spectral components. Various parameters of the hearing model can be adjusted by the encoder depending upon the signal characteristics. For example, a prototype masking curve is defined in terms of two piecewise continuous line segments, each with its own slope and y-intercept.

Word-Length Requirements of Processing Blocks

Floating point arithmetic usually uses the procedures set out in IEEE 754 (i.e. 32 bit representation, with 24-bit mantissa, 7-bit exponent & 1 sign bit) which is adequate for high quality AC-3 encoding. Work-stations like *Sun SPARC-station* 20 (TM) can provide much higher precision (e.g. double precision is 8 bytes). However floating point units require greater integrated circuit area and consequently must DSP Processors use fixed point arithmetic. The AC-3 encoder, in use, is often intended to be a part of a consumer product e.g. DVDRAM (Digital Versatile Disk Readable And Writeable) where cost (chip area) is an important factor.

Being aware of the cost versus quality issue in the development of the AC-3 standard. Dolby Laboratories has ensured that the algorithms can be implemented on fixed-point processors, however an important issue is what word-length is required of the fixed-point processor for processing high quality audio signals.

The AC-3 encoder has been implemented on 24-bit processors such as the Motorola 56000 and has met with much commercial success. However, although the performance of an AC-3 encoder implemented on a 16-bit processor is universally assumed to be of low quality, no adequate study has been conducted to benchmark the quality or compare it with the floating point version.

As discussed above, using double precision (32-bit) to implement the encoder on a 16-bit processor can lead to high quality (even more than a 24-bit processor implementation). However, double precision arithmetic is very computationally expensive (e.g. on D950 single precision multiplication takes 1 cycle whereas double precision requires 6 cycles). Accordingly, rather than performing single or double precision throughout the whole encoding process, an analysis can be performed to determine adequate precision requirements for each stage of computation.

In the description that follows, for simplicity of expression (and to avoid repetition), the following, convention has been adopted. Notation x-y (set Asset B) implies that for the process, data elements within Set A are limited or truncated to x bits while the Set B elements are y bits long. For example, 16–32 (data:window) implies that, for windowing, data was truncated to 16 bits and the window coefficient to 32 bits. When appearing without any parenthesised explanation, e.g. x-y:explantation of the implied meaning is generally provided. If no explanation is provided the meaning will be clear from the context, and the brevity of expression has taken precedence over repetition of the same idea.

Based on extensive simulations and study of the statistics derived thereon, it has been determined that the different stages of the encoder can be suitably implemented with different combinations of computational precision, such as: 16–32, 32-16, 16—16 and 32—32. Suitable trade-off in terms of MIPS and quality are therefore made subject to the statistics obtained, and the computational strategies which may be adopted for various processing stages as a result are discussed below.

Transient Detection

In a simulation, the high-pass filtering and the subsequent segment analysis for transient detection was performed with 16 and 24-bit word-lengths (both single precision). The input PCM stream is assumed to be 16-bit and the filter coefficients are truncated to 16 bits also The output of the filter is a 16-bit number which is analysed for transients. Thus, this process is entirely 16—16 (data:coefficient).

Figure 2:
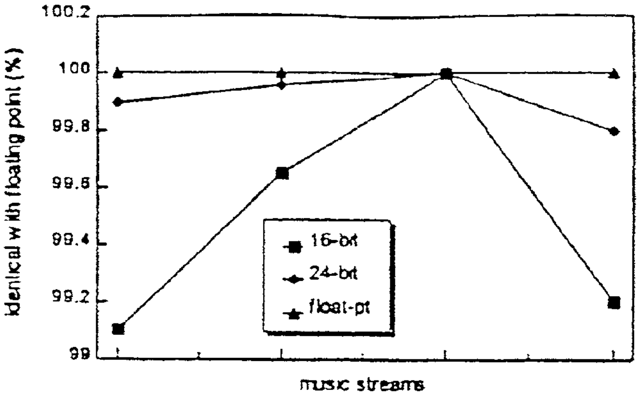
FIG. 2 is a comparison of 24—24 (data:coefficient) bit and 16—16 (data:coefficient) bit wordlengths with floating point calculations for transient detection.

The simulation results are compared with the floating point version resulting from processing with a Sun Sparc-Station 20 (TM). For the simulation, five music samples were used, namely: a) Drums, b) Harp, c) Piano, d) Saxophone and e) Vocal. Although not exhaustive, it is believed that these are sufficient to provide a good example of complex audio streams. FIG. 2 of the accompanying drawings is a graph of transient detection, with a comparison of 16—16 (data:coefficient) and 24—24 (data:coefficient) wordlengths with the floating point results. As is evident from the chart, the 16—16 result matches over 99% of the time with the floating point.

From FIG. 2 it is evident that for more than 99% cases, the 16-bit output from Transient Detection 13 (in terms of the blksw information) is same as the floating point version. This implies that for this stage of processing double precision computation adds little benefit, and 16-bit single precision is adequate. Simulation results for 24—24 (data: coefficient) are also shown in the Figure.

Forward Transform

Windowing

The audio block is multiplied by a window function to reduce transform boundary effects and to improve frequency selectivity in the filter bank 11. The values of the window function are included in ATSC specification Document referred to above. If the input audio is considered to be 16-bit then for windowing operation the data wordlength of more than 16 is unnecessary. For implementation on a 16-bit processor the window coefficients can be 16 or 32-bit. In general, 16-bit coefficients are inadequate and it is recommended that 32-bits be used for the windowing coefficients. Moreover, this step forms the baseline for further processing and limiting accuracy at this stage is not reasonable. However, if the input stream is 24-bit then 32-16 (data:coefficient) processing can be performed.

Time to Frequency Transformation

Based on the block switch flags, each audio block is transformed into the frequency domain by performing one long 512-point transform, or two short 256-point transforms. Each windowed data is 32-bit long. For the frequency transformation stage, coefficient (cosine and sine terms) length is restricted to 16-bit. Thus using previous terminology this is 32-16 (data:coefficient) computation.

The advantage of 32-16 precision is that the computation burden is not as much as he 32—32 (pure double-precision) version. On the D950 32-16 multiplication takes 3 cycles while 32—32 requires 6 cycles.

Figure 3:
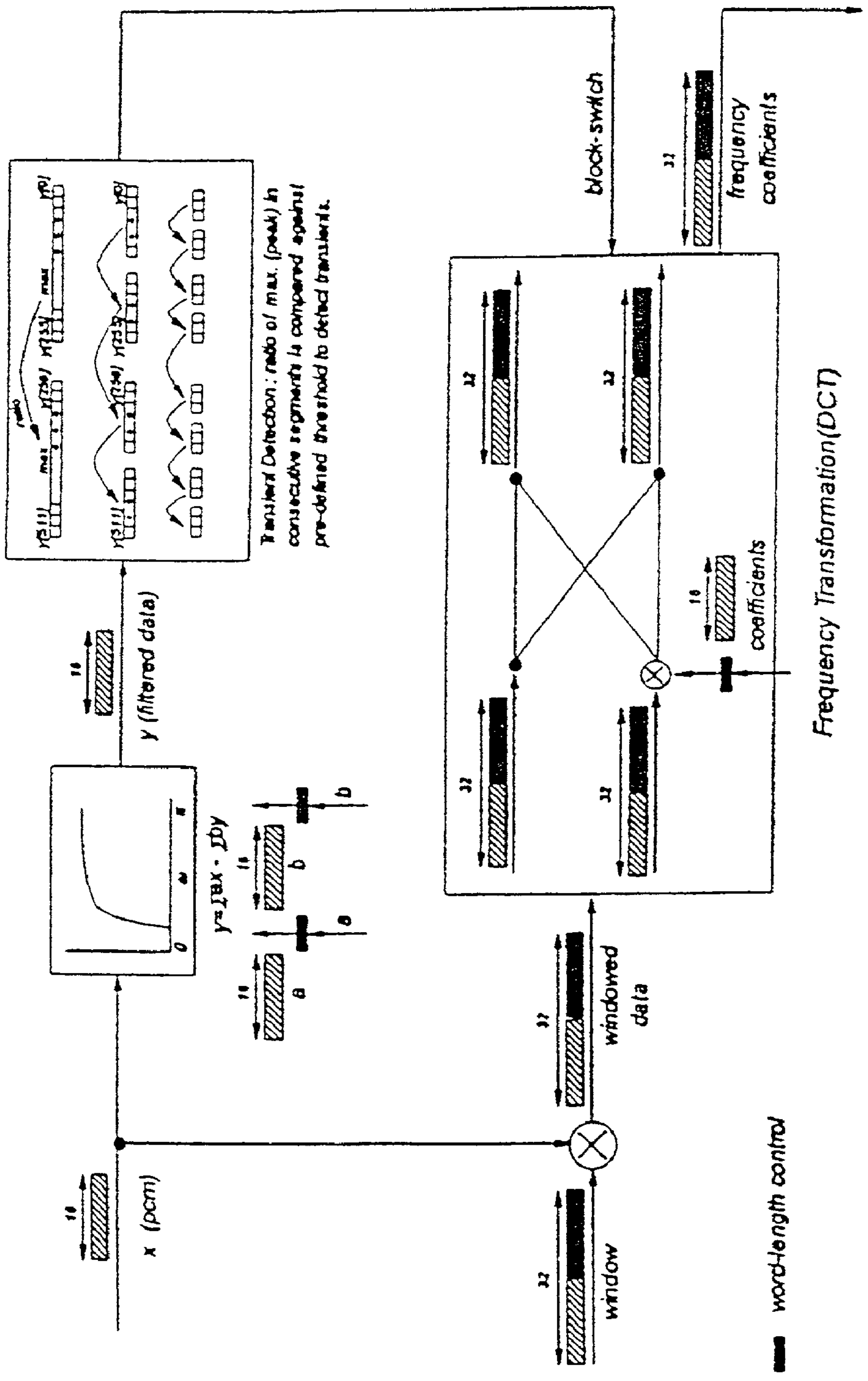
FIG. 3 is a flow diagram of a transient detection process, wherein 16-32 (data-coefficient) bit precision is used for windowing operations while 32-16 (data-coefficient) is used for frequency transformation.

FIG. 3 illustrates a transient detection procedure which is entirely 16-bit: 16-32 (data-coefficient) bit precision is used for the windowing operation while 32-16 (data-coefficient) is used for the frequency transformation. From FIG. 3, note that the windowing coefficients are 32-bit while the input data (CD Quality) is 16-bit. The 32-bit window is multiplied by the 16-bit data to generate 32-bit data. This 32-bit windowed signal is converted to the frequency domain using the Modified Discrete Cosine Transform (MDCT). The 32-16 precision is compared with the floating point version and the 24—24 bit version in Table 1, below, and the mean of the error and the standard deviation is tabulated.

TABLE 1

Frequency Transformation Stage: Mean (e) and Standard Deviation ($\sigma$) of the error floating-point and the fixed-point (32-16 & 24-24) implementations.

| | Drums | | Harp | | Piano | | Saxophone | | Vocal | |
|---|---|---|---|---|---|---|---|---|---|---|
| | $\bar{e}$ | $\sigma$ | $\bar{e}$ | $\sigma$ | $\bar{e}$ | $\sigma$ | $\bar{e}$ | $\sigma$ | $\bar{e}$ | $\sigma$ |
| 16–32 | 0.1 | 499 | 0.03 | 122 | 0.04 | 106 | 0.02 | 104 | 0.02 | 94.3 |
| 24–24 | 0.1 | 127 | 0.13 | 128 | 0.12 | 129 | 0.1 | 127 | 0.15 | 124 |

*all data has been pre-scaled (multiplied) by $10^{-5}$.

It can be observed that the mean error is about 0.0000005, wherein the discrepancy is usually at the 20 binary place. However, since the standard deviation ($\sigma$) is much larger than the mean ($\bar{e}$), it reflects more truly the behaviour of the different implementations. Given the set of observations, it is often convenient to condense and summarise the data by fitting it to a model that depends on adjustable parameters (in this case the error depends on the adjustable word-length). Therefore it is instructive to analyse the probability distribution of the error function.

Figure 4:
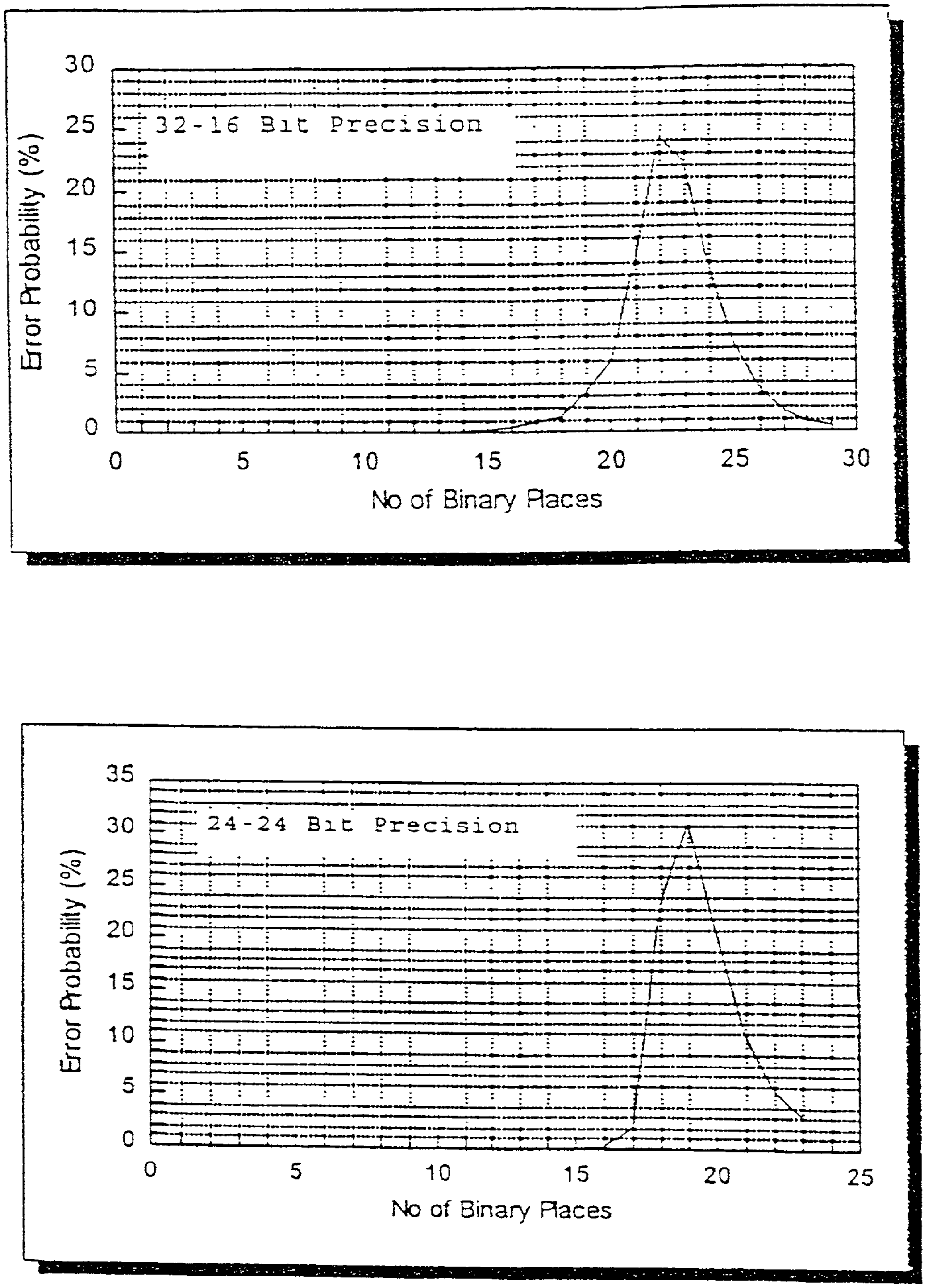
FIG. 4 shows comparative charts of error probability of fixed point (32-16 & 24—24), with the floating-point calculation as reference, for the frequency transformation stage.

FIG. 4 shows two charts of error probability for the frequency transformation stage for 32-16 and 24—24 fixed point computations with the floating-point version as reference. The probability distribution is based on simulation results with sample space of 40,000. From the Figure it can be observed that 80% of the time 21 to 25 bit accuracy exists for the 32-16 implementation. For the 24—24, the same is true for the range 18 to 21 bits. Assuming Gaussian distribution for the error-function (which is reasonable, looking at the probability distribution in the figure above), it can be stated that for 32-16, 99.7% of the time the error is less than 0.005 ($3\sigma$). The low value is highly influenced by the statistics from the drums section of the audio input. For 24—24, with 99.7% confidence, the error is less than 0.003 ($3\sigma$). From FIG. 4, it can also be noted that the spread of the error-function is less for 24—24 which implies a more stable performance as compared to 32-16. This figure of merit function, though not accurate at least serves to highlight that both the implementations have reasonably high accuracy.

Coupling Process

The computational requirements for the coupling process is quite appreciable, which makes selection of appropriate precision more difficult. The input to the coupling process is the channel coefficients each of 32-bit length. The coupling progresses in several stages. For each such stage appropriate word length must be determined.

Coupling Channel Generation Strategy

As discussed hereinabove, the coupling channel generation strategy is linked to the product $\Sigma a_i * b_i$, where $a_i$ and $b_i$ are the two coupled channel coefficients within the band in question. Although 32—32 (double precision) computation for the dot product would lead to more accurate results, it is also computationally prohibitive. An important issue, however, is that the output of this stage only influences how the coupling channel is generated, not the accuracy of the coefficients themselves. If the error from 16-bit computation is not appreciably large, computational burden can be decreased.

Figure 5:
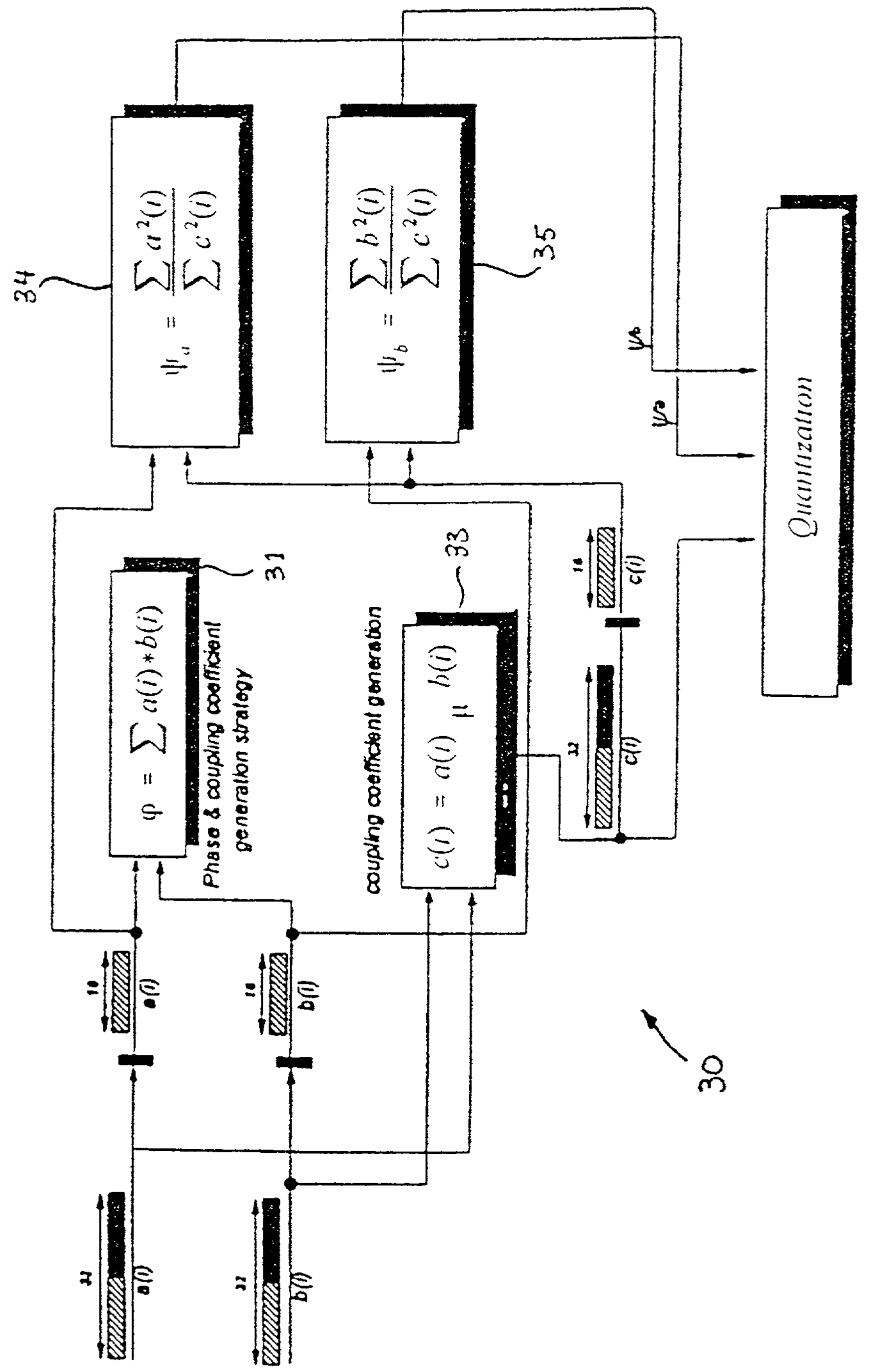
FIG. 5 is a block diagram illustrating coupling coefficient generation and phase estimation.

FIG. 5 is a block diagram of the coupling process 30. In the process shown in this Figure, 16-bit (upper half) single precision only is utilised for the coupling coefficient generation strategy and phase emission. The actual coupling is then performed on the full 32-bit data. Coupling co-ordinates may be generated also using single precision.

As shown in the Figure, for phase estimations and coupling coefficient generation strategy (31), the upper 16-bits of the full 32-bit data from the frequency transformation stage may be used. The actual coupling coefficient generation of $c_i=(a_i \pm b_i)/2$ (33) is performed using 32—32 ($a_i$;$b_i$) precision.

A similar approach of 16—16 ($a_i$;$b_i$) is used for the coupling co-ordinate generation (34, 35) However, the final division involved in the co-ordinate generation must preferably be done with highest precision possible. For this it is recommended that the floating point operation be emulated, that is the exponents (equivalents to number of leading zero) and mantissa (remaining 16 bits after removal of leading zeros). The division can then be performed using the best possible method as provided by the provided by the processor to provide maximum accuracy. Since coupling coordinates anyway need to be converted to floating point format (exponent and mantissa) for final transmission, this approach has dual benefit.

TABLE 2

Coupling Strategy: coupling strategy for each band with the 24-24 and the 16-16 approach are compared (in percentage %) with the floating point version. While 24-24 gives superior result, the 16-16 fares badly.

| | Band 0 | | Band 1 | | Band 2 | | Band 3 | |
|---|---|---|---|---|---|---|---|---|
| | 16-16 | 24-24 | 16-16 | 24-24 | 16-16 | 24-24 | 16-16 | 24-24 |
| Drums | 84.1 | 99.7 | 75 | 99.8 | 90 | 100 | 91 | 100 |
| Harp | 75.2 | 99.2 | 72.7 | 99.4 | 78.1 | 99.5 | 75.1 | 99.5 |
| Piano | 88.2 | 99.9 | 84 | 99.4 | 86 | 99.2 | 76 | 98.7 |
| Saxophone | 73.6 | 99.9 | 56 | 99.8 | 76.2 | 99.7 | 81.4 | 9.8 |
| Vocal | 98.6 | 97.8 | 97.8 | 100 | 98.6 | 99.8 | 96.5 | 100 |

Table 2, above, illustrates comparative results of coupling strategies in bands for the simulation audio data, using the floating point calculations as a reference. The results for 16—16 are not as desired. Upon analysis of the reason for the low performance it can be shown that usually the coupling coefficient are low value. Thus, even though the coupling coefficient may be represented by 32-bits the higher 16-bits are normally almost all zeros. Therefore simple truncation of the upper 16 bits produce poor results.

A variation of the block exponent strategy, discussed below, can be used to improve the results.

Figure 6:
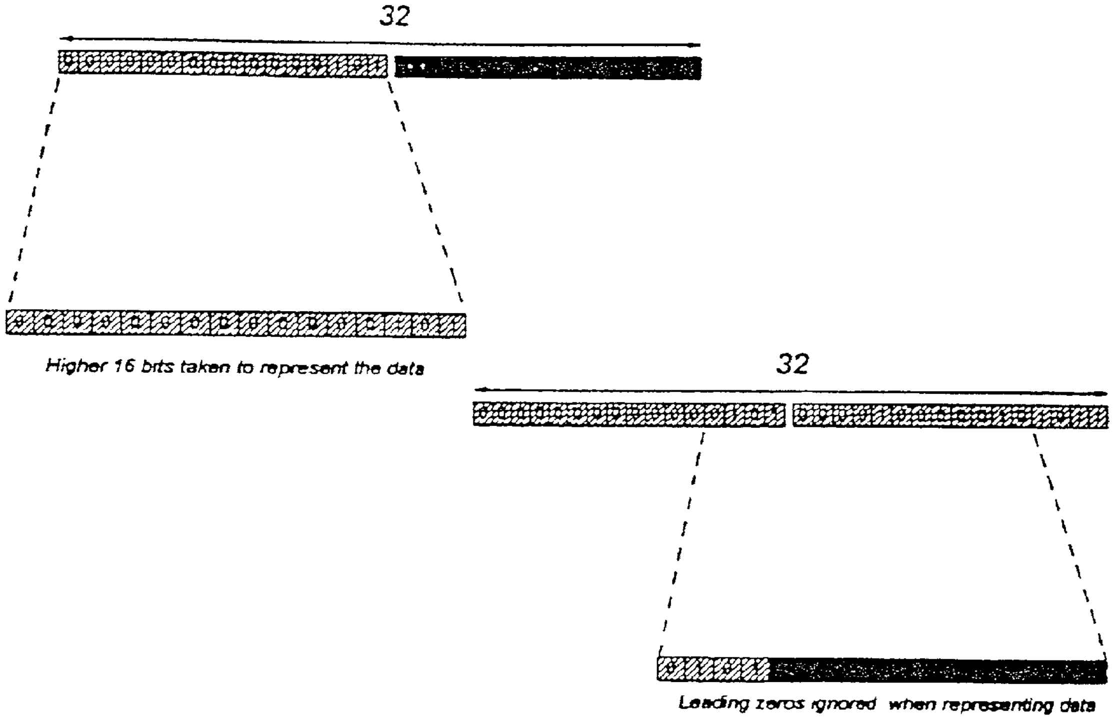
FIG. 6 is a diagram illustrating block exponent processing.

FIG. 6 is a diagram illustrating block exponent processing, showing a pre-processing stage which can be implemented before truncation of the 32-bit to 16-bit for the phase estimation, coupling coefficient generation strategy and calculation of the coupling co-ordinate. In this procedure, the coefficients within the band (or sub-band depending on the level of processing) are analysed to find the minimum number of leading zeros (in actual implementation the maximum absolute rather than leading zeros are used for scaling). The entire coefficient set within the band is then shifted (equivalent to multiplication) to the left and then the remaining upper 16 bits are utilised for the processing. Note that for the phase estimation and coupling strategy the multiplication factor has no affect as long as both the left and right channels within the band have been shifted by same number of bits.

For the coupling co-ordinate generation phase, both the coupling and the coupled channels should have the same multiplication factor so that they cancel out. Alternately, if floating point emulation is used as recommended above, the coupling and coupled channels may be on different scale. The difference in scale is compensated in the exponent value of the final coupling co-ordinate. Consider, for example, a that band has only 4 bins, 96 . . . 99 a[96]=(0000 0000 0000 0000 1100 0000 0000 1001)
b[96]=(0000 0000 0000 0000 0000 0000 0000 0100)
c[96]=(0000 0000 0000 0000 0110 0000 0000 0110)
a[97]=(0000 0000 0000 0000 1100 0000 0000 0000)
b[97]=(0000 0000 0000 0000 0001 0000 0000 1000)
c[97]=(0000 0000 0000 0000 0110 1000 0000 0100)
a[98]=(0000 0000 0000 0000 0000 0000 0000 1000)
b[98]=(0000 0000 0000 0000 0000 0000 0000 1100)
c[98]=(0000 0000 0000 0000 0000 0000 0000 1010)
a[99]=(0000 0000 0000 0000 1100 0000 0000 1000)
b[99]=(0000 0000 0000 0001 0000 0000 0000 1100)
c[99]=(0000 0000 0000 0000 1110 0000 0000 1010)

*Note: for this example $c_i=(a_i+b_i)/2$

Considering only the upper 16-bits in this case will clearly lead to a poor result. For example coupling co-ordinate $\psi_1=(\Sigma a^2/\Sigma b^2)$ will be zero, thereby wiping away all frequency components within the band for channel $\alpha$ when the coupling coefficient is multiplied by the coupling co-ordinate at the decoder to reproduce the coefficients for channel $\alpha$. However, by removing the leading zeros, the new coefficients for channel a will be:

a[96]=(00 1100 0000 0000 10)
a[97]=(00 1100 0000 0000 00)
a[98]=(00 0000 0000 0000 10)
a[99]=(00 1100 0000 0000 10)

on which more meaning measurements can be performed. The scaling factor will have to be compensated in the exponent value for the coupling co-ordinate. With this approach the performance of phase estimation with 16—16 bit processing drastically as illustrated by the results shown in Table 3, as compared to the figures in Table 2.

TABLE 3

Coupling strategy for the two implementation (16-16) and (24-24) as compared (in percentage %) to the floating point version. By use of block exponent method of accuracy of the 16-16 version is much improved compared to the figures in Table 2.

| | Band 0 | | Band 1 | | Band 2 | | Band 3 | |
|---|---|---|---|---|---|---|---|---|
| | 16-16 | 24-24 | 16-16 | 24-24 | 16-16 | 24-24 | 16-16 | 24-24 |
| Drums | 100 | 99.7 | 99.8 | 99.8 | 100 | 100 | 99 | 100 |
| Harp | 99.7 | 99.2 | 99.4 | 99.4 | 99.5 | 99.5 | 99.57 | 99.5 |
| Piano | 100 | 99.9 | 99.9 | 99.4 | 99.9 | 99.2 | 100 | 98.7 |
| Saxophone | 100 | 99.9 | 100 | 99.8 | 76.2 | 99 | 81.4 | 100 |
| Vocal | 100 | 98.8 | 97.8 | 100 | 99.4 | 99.8 | 99.6 | 100 |

Accordingly, as shown in FIG. 5, the coupling co-ordinates may be calculated using 16-bit values only. The pre-processing stage of the 32-bit numbers before truncation again serves to improve results appreciably. From Table 4, below, it is evident that both the 24—24 and the 16–32 versions have similar performance.

TABLE 4

Mean (e) and standard deviation (σ) of the error between the floating point - and 16-16 (with block exponent) and 24-24 version. The figures are almost the same for both implementations.

| | Drums | | Harp | | Piano | | Saxophone | | Vocal | |
|---|---|---|---|---|---|---|---|---|---|---|
| | $\bar{e}$ | σ | $\bar{e}$ | σ | $\bar{e}$ | σ | $\bar{e}$ | σ | $\bar{e}$ | σ |
| 16–32 | 0.04 | 0.23 | 0.08 | 0.31 | 0.12 | 0.36 | 0.23 | 0.44 | 0.05 | 0.27 |
| 24–24 | 0.04 | 0.22 | 0.09 | 0.33 | 0.12 | 0.37 | 0.04 | 0.23 | 0.04 | 0.28 |

Rematrixing

The upper 16-bits of the 32-bits data resulting from the frequency transformation stage may be utilised to determine rematrixing for each band, in a manner similar to the coupling phase estimation. Within each rematrixing band, power measurements are made for the left channel (L), right channel (R); and the channel resulting from the sum (L+R) and difference (L−R).

If the maximum power is found in the L÷R and L−R singal, then the rematrix flag is set and for that band, and L+R and L−R are encoded instead of L and R. For the encoding process full 32-bit data is used to provide maximum accuracy.

If the maximum power is in L or R, the rematrixing flag is not set for that band and the 32-bit data moves directly to the encoding process. Table 5 below compares the 16-bit (as just described) to the floating point version. The high figures indicate that for computing the rematrixing flag, the above described block exponent method is not necessary.

TABLE 5

Comparison (in percentage %) of the remaining flag for the floating point - and 16-16 (without block exponent) and 24-24 version. The high figures (94%–100%) for the 16-16 indicate that block exponent procedure is not very necessary.

| | Band 0 | | Band 1 | | Band 2 | | Band 3 | |
|---|---|---|---|---|---|---|---|---|
| | 16-16 | 24-24 | 16-16 | 24-24 | 16-16 | 24-24 | 16-16 | 24-24 |
| Drums | 100 | 100 | 99.6 | 100 | 99 | 99.6 | 99.6 | 100 |
| Harp | 95.3 | 97.6 | 95.3 | 99.4 | 97 | 98.8 | 94.7 | 97.6 |
| Piano | 99.3 | 100 | 100 | 100 | 100 | 100 | 100 | 100 |
| Saxophone | 96.3 | 98.9 | 97 | 99.2 | 99.2 | 99 | 99.6 | 100 |
| Vocal | 99.6 | 100 | 100 | 100 | 99.3 | 100 | 100 | 100 |

RESULTS

Figure 7:
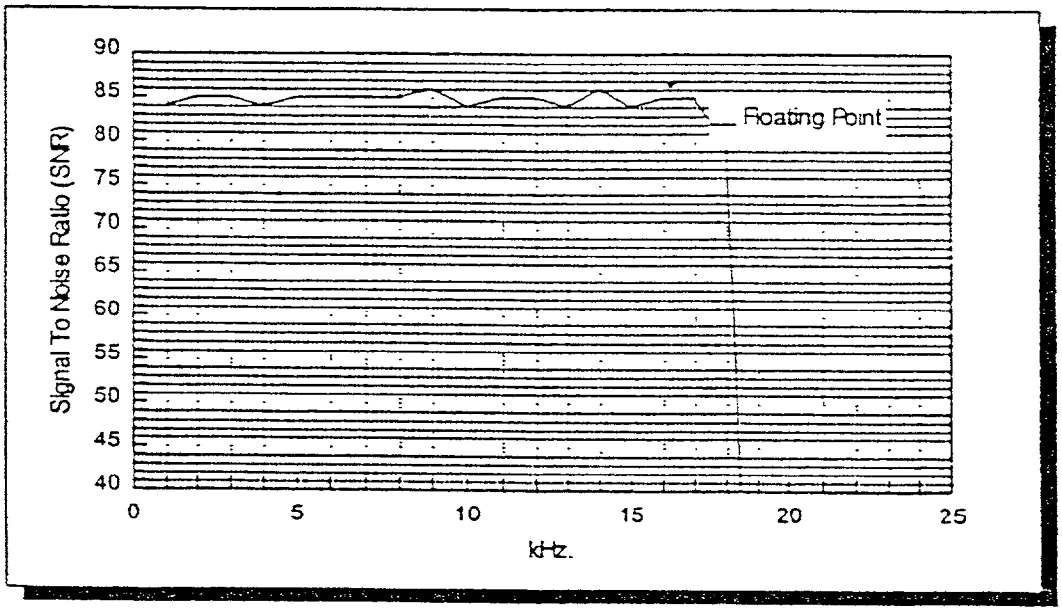
FIGS. 7, 8 and 9 are frequency response charts of AC-3 encoder implementation in terms of signal-to-noise ratio for floating point, 16–32 and 24 bit calculations, respectively.
Figure 8:
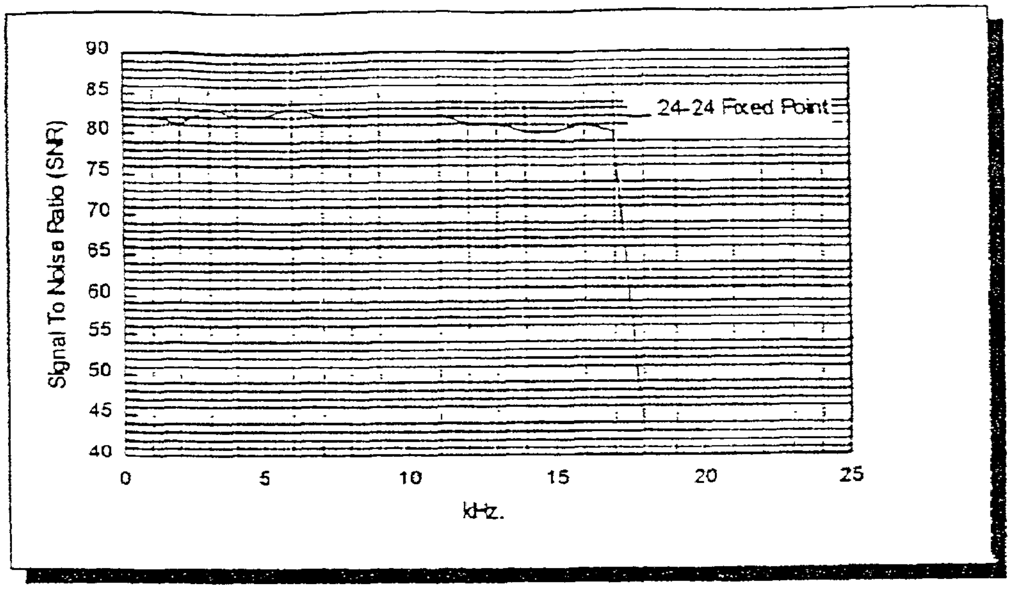
Figure 9:
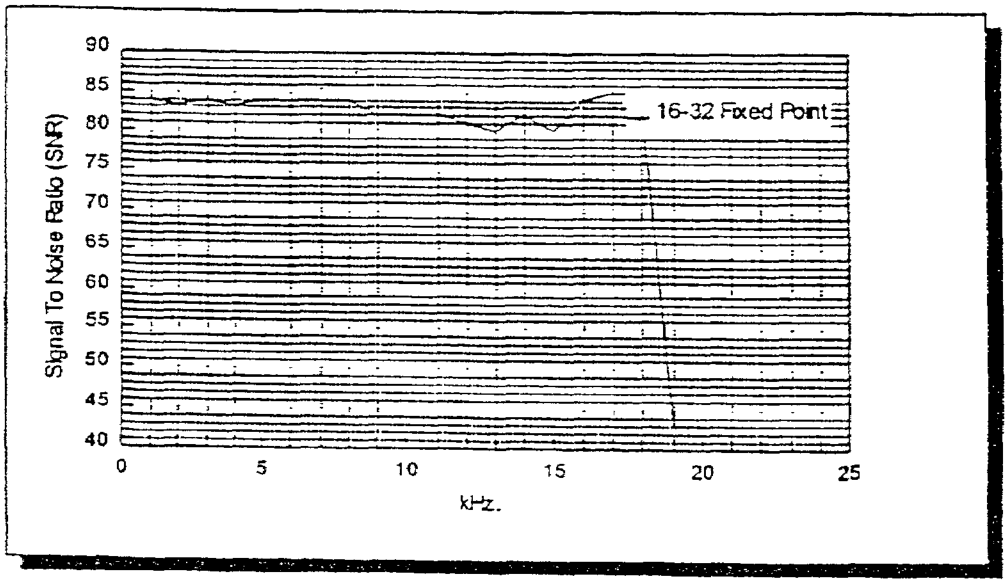

FIGS. 7, 8 and 9 are frequency response charts in terms of signal-to-noise ratio for the three discussed implementations, namely floating point, 24—24 bit and 16–32 bit calculations, respectively. This result is obtained by encoding-decoding 100 dB sinusoids at discrete frequency points, for the encoder version in question. The output from the decoder is compared with the original sinusoid to estimate the SNR. Note from the graph that the floating-point version gives average SNR of 85 dB (16-bit PCM has SNR of 96 dB).The SNR measurement does not take the masking and psychoacoustic effects in consideration, but nevertheless gives a number with which to compare different implementations. The frequency response shown in FIG. 8 is of the 24—24 AC-3 encoder, which implies that for all processing single precision arithmetic with register length of 24-bit was assumed. On the other hand, the frequency response shown in FIG. 9 is of the 16–32 AC-3 encoder, which in this context implies: 16—16 for transient detection, 16–32 for windowing, 32-16 for Frequency Transformation, 16—16 for coupling (determining phase and coupling co-ordinate), 32—32 for coupling generation, 16—16 for calculation of rematrixing flag and 32—32 for the rematrixing process.

The invention claimed is:

1. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded data using a second level of computational precision different than the first level of computational precision, wherein the transform encoding process is in accordance with AC-3 Digital Audio Compression Standard, wherein the transform encoding process includes a transient detection process for detecting transients in the audio data and wherein the transient detection process is carried out with single precision computations.

2. A method as claimed in claim 1, wherein the digital signal processor comprises a 16-bit digital signal processor which is capable of single (16-bit) precision computations and double (32-bit) computations.

3. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the first and second computation stage are of a plurality of computation stages that include transient detection, windowing, frequency transformation, coupling strategy determination and coupling channel computation, and rematrixing determination and computation.

4. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the transform encoding process includes a windowing function which is carried out with single precision audio data and double precision coefficients.

5. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the transform encoding process includes a windowing function which is carried out with double precision audio data and single precision coefficients.

6. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the transform encoding process includes a frequency transformation process which is performed with double precision data and single precision coefficients.

7. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the transform encoding process includes determination of a coupling strategy and/or a phase strategy, and wherein the determination is performed with single precision data.

8. A method as claimed in claim 7, wherein the determination of coupling and/or phase strategy includes pre-processing by use of a block exponent method, wherein double precision frequency coefficients are shifted to eliminate leading zeros and truncated to single precision.

9. A method as claimed in claim 7, wherein the transform encoding process includes the formation of a coupling channel which is performed with double precision data.

10. A method for coding digital audio data, comprising:

a transform encoding process implemented on a fixed point digital signal processor having plural levels of computation precision, wherein the transform encoding process includes:

a first computation stage involving arithmetic operations in transforming the digital audio data into intermediate audio data using a first level of computational precision; and a second computation stage involving arithmetic operations in transforming the intermediate audio data into coded audio data using a second level of computational precision different than the first level of computational precision, wherein the transform encoding process is in accordance with AC-3 Digital Audio Compression Standard, wherein the transform encoding process includes a rematrixing determination which is performed with single precision data, and a rematrixing coding process which is performed with double precision data.

11. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the plurality of computation blocks include transient detection, windowing, frequency transformation, coupling strategy determination and coupling channel computation, and rematrixing determination and computation.

12. An audio transform encoder as claimed in claim 11, wherein the digital signal processor comprises a 16-bit digital signal processor which is capable of single (16-bit) precision computations and double (32-bit) computations.

13. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal process using different levels of computational precision, wherein the transform encoding process code is in accordance with AC-3 Digital Audio Compression Standard, wherein the transform encoding process code includes a transient detection block for detecting transients in the audio data, and wherein the transient detection block utilizes single precision computations.

14. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the transform encoding process code include a windowing block which utilizes single precision audio data and double precision coefficients.

15. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the encoding process code includes a windowing block which utilizes double precision audio data and single precision coefficients.

16. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the transform encoding process code includes a frequency transformation block which utilizes double precision data and single precision coefficients.

17. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the transform encoding process code includes a block for determination of a coupling strategy and/or a phase strategy, and wherein the determination utilizes single precision data.

18. An audio transform encoder as claimed in claim 17, wherein the block for determination of coupling and/or phase strategy utilizes pre-processing by use of a block exponent method, wherein double precision frequency coefficients are shifted to eliminate leading zeros and truncated to single precision.

19. An audio transform encoder as claimed in claim 17, wherein the transform encoding process code includes a block for the formation of a coupling channel which utilizes double precision data.

20. A digital audio transform encoder for coding a digital audio data block into compressed audio data, comprising:

a fixed point digital signal processor having multiple levels of computation precision; and transform encoding process code stored in firmware or software for controlling the digital signal processor, wherein the transform encoding process code includes a plurality of computation blocks involving arithmetic operations in transforming the digital audio data block into compressed audio data, and wherein different ones of the computation blocks are performed on the digital audio data block by the digital signal processor using different levels of computational precision, wherein the transform encoding process code is in accordance with AC-3 Digital Audio Compression Standard, wherein the transform encoding process code includes a rematrixing determination block which utilizes single precision data, and a rematrix coding block which utilizes double precision data.

21. A digital audio transform encoder for coding digital audio data into compressed audio data in accordance with an AC-3 Digital Audio Compression Standard, comprising:

a first computation block structured to perform arithmetic operations in transforming the digital audio data into the compressed audio data using a first level of computational precision; and a second computation block coupled to the first computation block and structured to perform arithmetic operations in transforming the digital audio data into the compressed audio data in concert with the first computation block, the second computation block using a second level of computational precision that is different from the first level of computational precision, wherein the first computation block includes a transient detection block for detecting transients in the audio data, and wherein the transient detection block utilizes single precision computations.

22. The audio transform encoder of claim 21 wherein the first and second computation blocks are implemented as first and second blocks of computer instructions that are executed by a digital signal processor.

23. The audio transform encoder of claim 21, wherein the second computation block includes a windowing block that utilizes single precision audio data and double precision coefficients.

24. The audio transform encoder of claim 21 wherein first level of computational precision is performed using data elements of a first number of bits and the second level of computational precision is performed using data elements of a second number of bits.

* * * * *

UNITED STATES PATENT AND TRADEMARK OFFICE

CERTIFICATE OF CORRECTION

PATENT NO. : 7,117,053 B1
APPLICATION NO. : 09/830441
DATED : October 3, 2006
INVENTOR(S) : Mohammed Javed Absar et al.

It is certified that error appears in the above-identified patent and that said Letters Patent is hereby corrected as shown below:

Title Page
Item (75), Inventors, the third named inventor should read as --Antonio--.

Column 15
Line 55, "...coded data using a second level of computational..." should read as --...coded audio data using a second level of computational...--.

Column 15
Line 61, "...transients in the audio data and wherein the transient..." should read as --... transients in the audio data, and wherein the transient ...--.

Column 16
Line 18, "...stage are of a plurality of computation stages that..." should read as --stages are of a plurality of computation stages that ...--.

Column 17
Line 59, "...with single precision data, and a rematrixing..." should read as --... with single precision data, and a rematrix...--.

Column 18
Line 30, "......by the digital signal process using..." should read as --... by the digital signal processor using ...--.

Column 18
Line 44, "......the transform encoding process includes a..." should read as --... the transform encoding process code includes a ...--.

UNITED STATES PATENT AND TRADEMARK OFFICE

CERTIFICATE OF CORRECTION

PATENT NO. : 7,117,053 B1
APPLICATION NO. : 09/830441
DATED : October 3, 2006
INVENTOR(S) : Mohammed Javed Absar et al.

It is certified that error appears in the above-identified patent and that said Letters Patent is hereby corrected as shown below:

Column 18

Line 53, "......the transform encoding process code include a..." should read as --... the transform encoding process code includes a ...--.

Signed and Sealed this

First Day of May, 2007

JON W. DUDAS

*Director of the United States Patent and Trademark Office*